W. C. REES & S. ETHERINGTON.
SANITARY WATER CLOSET.
APPLICATION FILED JULY 17, 1912.

1,092,391.

Patented Apr. 7, 1914.
5 SHEETS—SHEET 1.

Witnesses
C. L. Perkins
K. M. Sullivan

Inventors
Warren C. Rees
Stanley Etherington
By Chas. F. Perkins Atty

W. C. REES & S. ETHERINGTON.
SANITARY WATER CLOSET.
APPLICATION FILED JULY 17, 1912.

1,092,391.

Patented Apr. 7, 1914.
5 SHEETS—SHEET 5.

Witnesses.
C. L. Perkins
H. M. Sullivan

Inventors
Warren C. Rees
Stanley Etherington
By Chas. F. Perkins Atty.

UNITED STATES PATENT OFFICE.

WARREN C. REES, OF SOMERVILLE, AND STANLEY ETHERINGTON, OF WINTHROP, MASSACHUSETTS, ASSIGNORS TO ASEPTIC SERVICE COMPANY, A CORPORATION OF MAINE.

SANITARY WATER-CLOSET.

1,092,391.  Specification of Letters Patent.  Patented Apr. 7, 1914.

Application filed July 17, 1912. Serial No. 709,855.

*To all whom it may concern:*

Be it known that we, WARREN C. REES, of Somerville, in the county of Middlesex and State of Massachusetts, and STANLEY ETHERINGTON, of Winthrop, county of Suffolk, and said State, citizens of the United States, have invented new and useful Improvements in Sanitary Water-Closets, of which the following is a specification.

This invention relates to sanitary water closets, and its object is to provide an automatic mechanism for laying a fresh paper covering over the seat previous to use by each successive occupant.

In the preferred form of our device we use a modification of that type of seat known as the "horseshoe" having two separate straight sides, and being open both in front and in back, whereas the "horseshoe" is open only in front, the paper being supplied to each of these sides from separate rolls by separate feeding mechanisms, both however actuated by the same operating mechanism. Thus no perforation is necessary and ordinary rolls of paper may be employed just as they come from the mill without special preparation. An added advantage arising from use of the double instead of the single sheet of paper is that each section of the paper covers a smaller area of the seat, and thus may be more firmly held with less danger of displacement or injury. We do not limit ourselves, however, to the use of this particular form of seat, as our improved mechanism is adapted to be combined with any other type having not only sides, but front or back, or both.

A radically novel feature is the employment of a barrier for preventing use of the seat without prepayment. This barrier consists of a pivoted skeleton frame, carrying a series of curved bars normally extending over the seat in such a manner as to obstruct its use, in which position the barrier is locked until released by the deposit of a coin in a slot. When thus released the barrier may be swung down under the seat and out of the way of the occupant.

This invention further consists in a variety of novel structural features and the new arrangement and combination of parts hereinafter described.

Figure 1:
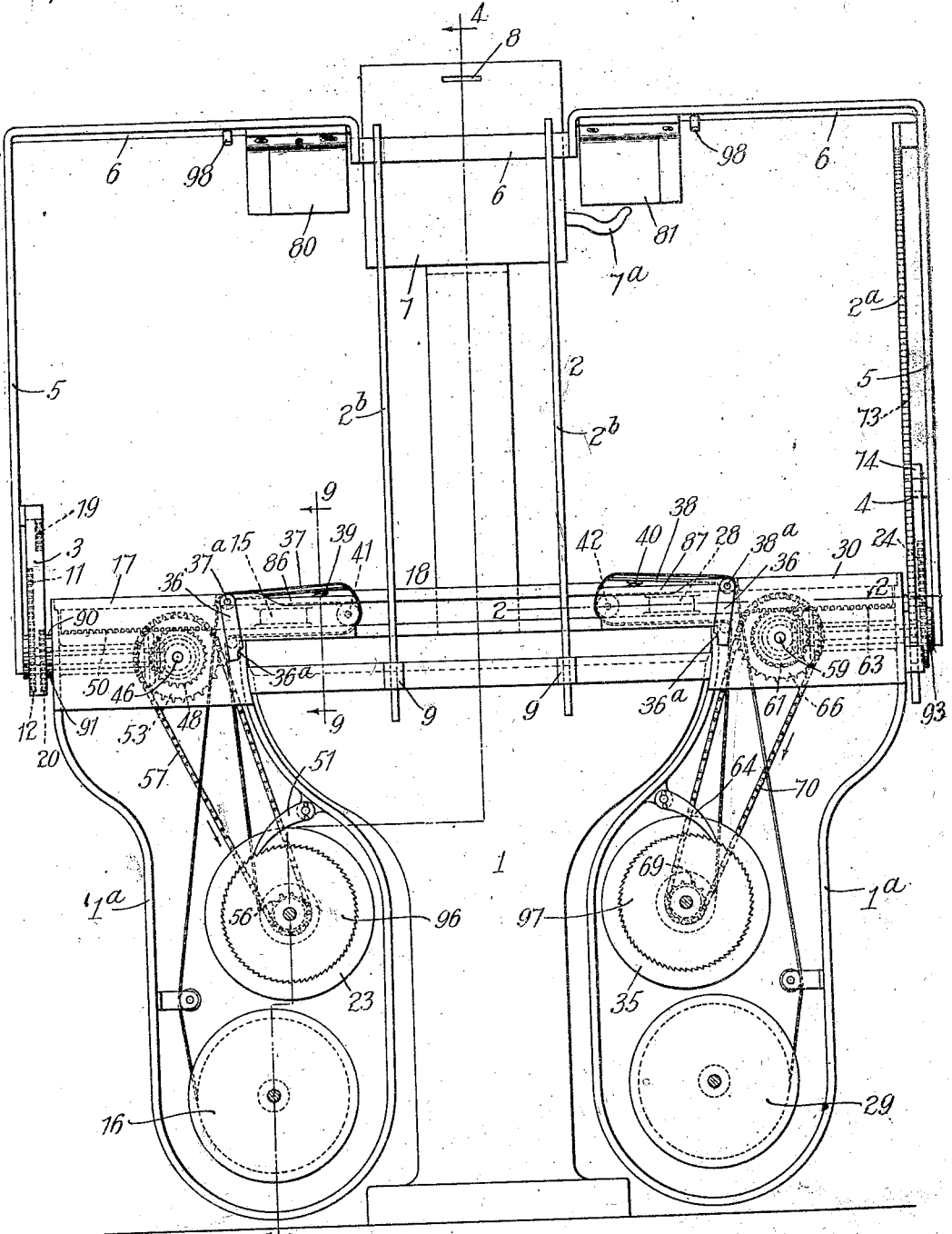
Figure 2:
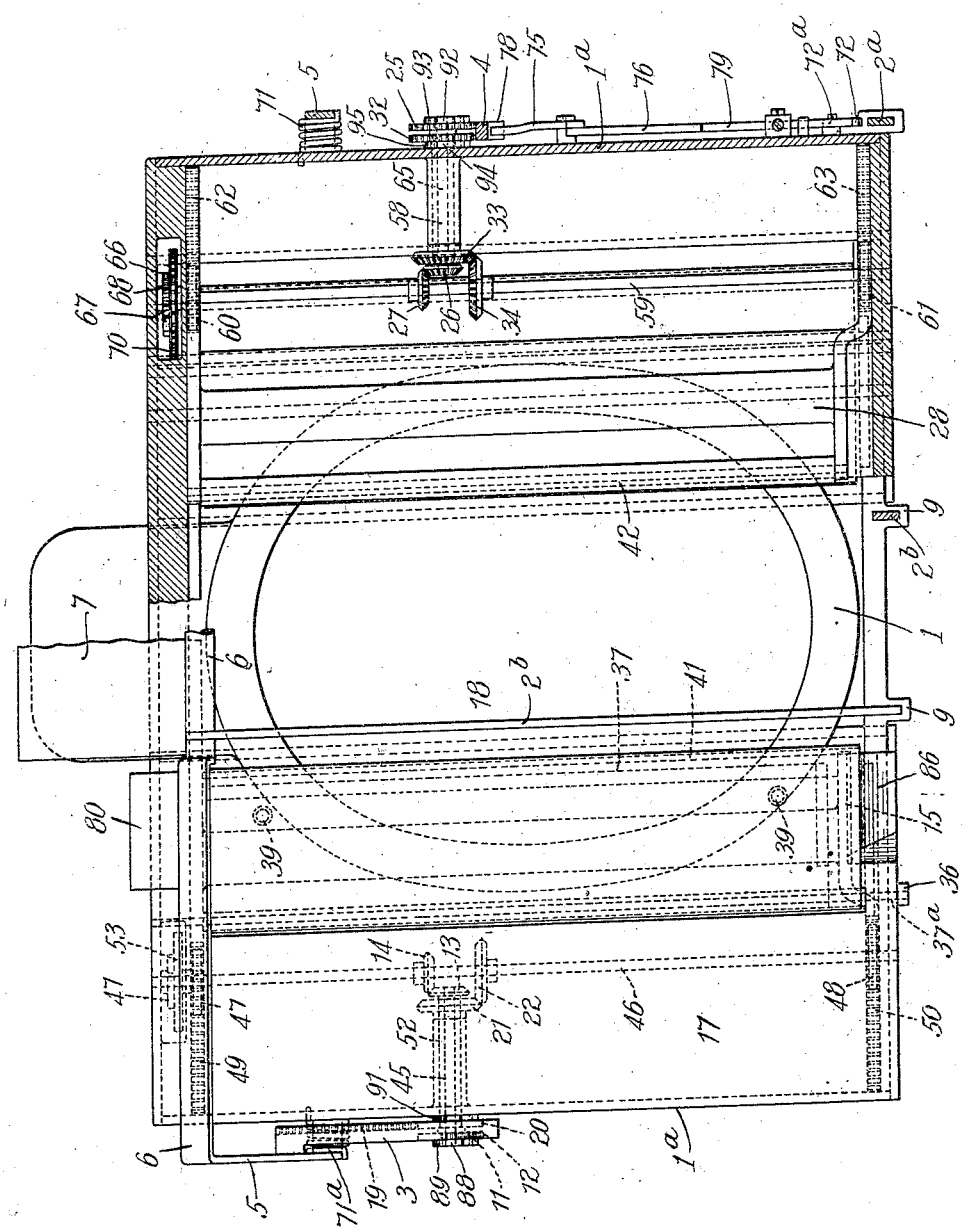
Figure 3:
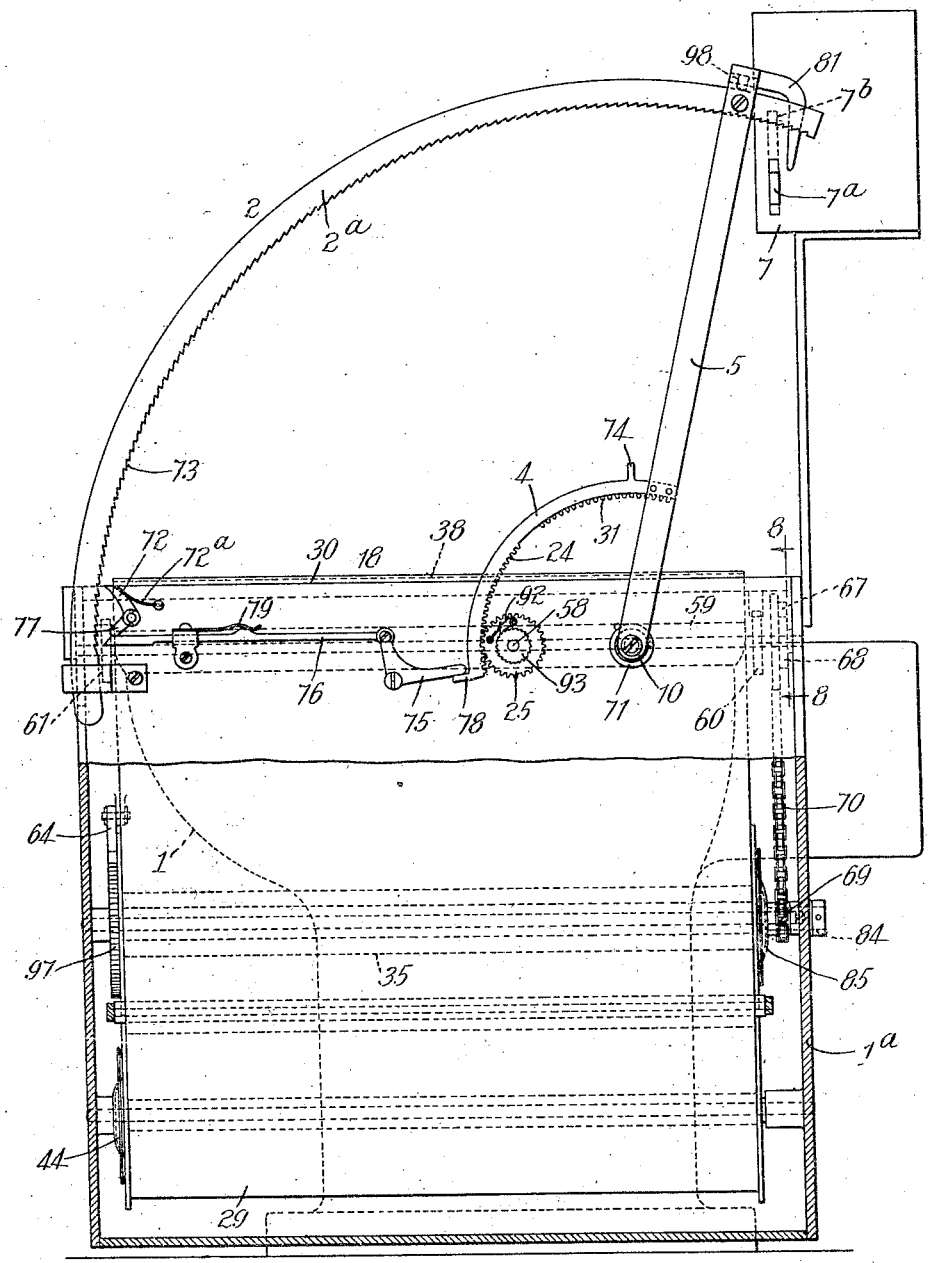
Figure 4:
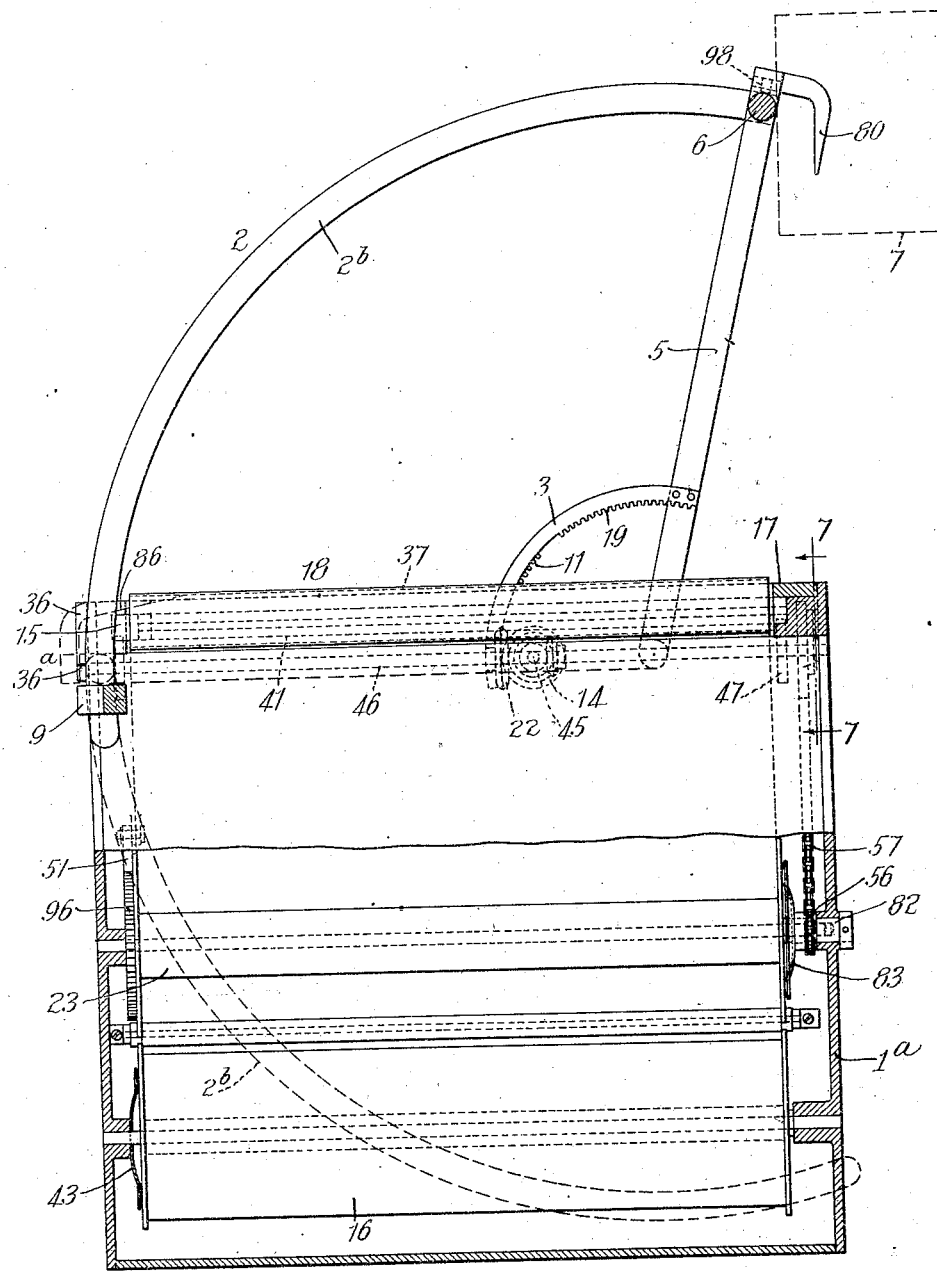
Figure 5:
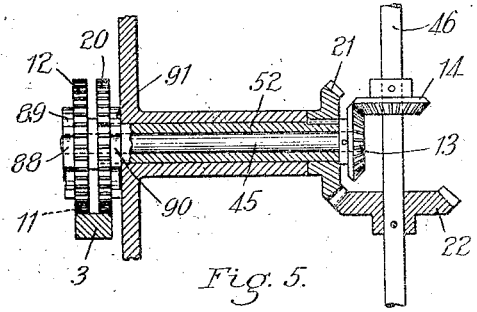
Figure 6:
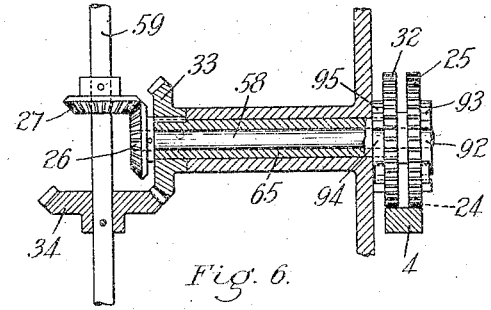
Figure 7:
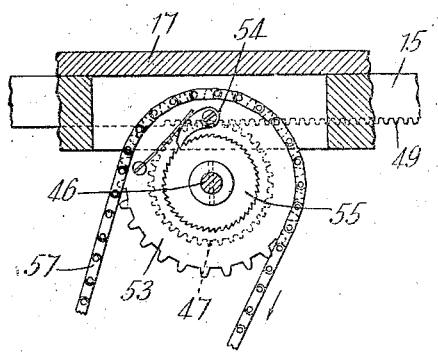
Figure 8:
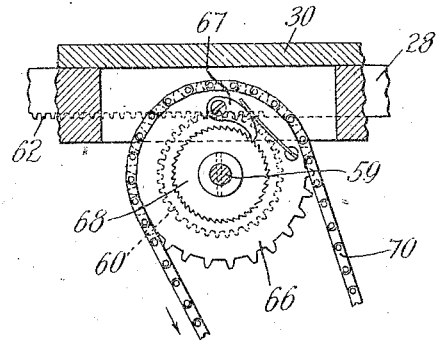
Figure 9:
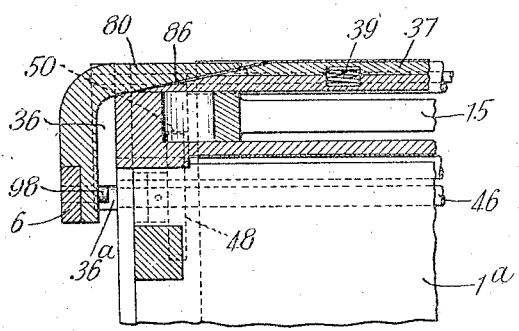
Figure 10:
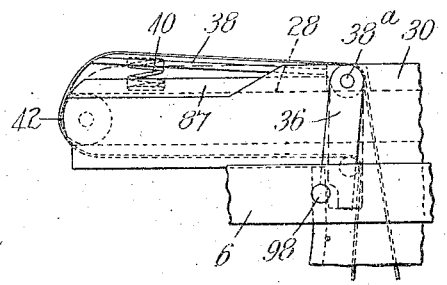

In the accompanying drawing, in which corresponding parts are indicated by like numerals in the various figures thereof, Figure 1 is a front elevation of our device, showing the front cover plates removed and the barrier raised and locked. Fig. 2 is a partial plan and plan section on line 2—2 of Fig. 1. Fig. 3 is a side elevation showing the casing partially broken away. Fig. 4 is a vertical section on line 4—4 of Fig. 1. Fig. 5 is a horizontal section of a portion of the left side paper supply mechanism. Fig. 6 is a horizontal section of a portion of the right side paper supply mechanism. Fig. 7 is a side elevation of a portion of the left side paper supply mechanism. Fig. 8 is a side elevation of a portion of the right side paper supply mechanism. Fig. 9 is a vertical section on line 9—9 of Fig. 1, showing the barrier depressed and locked. Fig. 10 is a detail elevation of the latch 36.

Referring to the drawing, the bowl is represented by the numeral 1.

$1^a$ is the casing inclosing the mechanism, which may be secured to the bowl in any suitable manner. This casing also serves as a support for the various bearing mountings.

18 is the seat composed of the sides 17 and 30, and superstructure sides 37 and 38.

2 is the barrier composed of the curved bars $2^a$ and $2^b$, quadrants 3 and 4, radial arms 5 and the cross bar 6. The barrier also serves as the main actuating lever for operating the mechanism. The upper ends of the curved bars $2^b$ extend into the coin box 7, which is the device for locking the barrier in the position shown in Fig. 1, until released by the deposit of a coin in the slot 8, in the coin box 7. Any one of several well known coin box constructions may be used, which is adapted to release the lever $7^a$ when a coin is deposited in the box 7. The lever $7^a$ engages with slots $7^b$ in the ends of the curved bars $2^b$.

9 represents guide collars which support the curved bars $2^b$ of the barrier, which is pivoted at 10.

11 is a rack formed on the quadrant 3, which engages, during the first part of the downward movement of the barrier, the gear 12, which, through the intermediate gears 13 and 14, operates to advance the plunger 15, which draws the fresh section of paper from the reservoir spindle 16 over the side 17 of the seat 18.

19 is the rack formed on the quadrant 3, which engages, during the last part of the downward movement of the barrier, the gear 20, which, through intermediate gears 21 and 22, operates to withdraw the plunger 15 and rotate the take-up spindle 23.

24 is a rack formed on the quadrant 4, which engages, during the first part of the downward movement of the barrier, the gear 25, which through the intermediate gears 26 and 27, operates to advance the plunger 28, which draws the fresh section of paper from the reservoir spindle 29 over the side 30 of the seat 18.

31 is a rack formed on the quadrant 4, which engages, during the last part of the downward movement of the barrier, the gear 32, which, through intermediate gears 33 and 34, operates to withdraw the plunger 28 and rotate the take-up spindle 35.

36 is a latch which locks the barrier in its extreme depressed position.

37 and 38 are the sides of the superstructure of the seat 18, hinged respectively at 37ª and 38ª, and supported on springs 39 and 40.

41 and 42 are friction rollers supported in bearings secured to the front of the plungers 15 and 28 respectively which facilitate the drawing of the paper over the superstructure sides 37 and 38.

43 and 44 are cup springs which retard the rotation of the reservoir spindles 16 and 29 respectively.

Referring to Fig. 5, 45 is a shaft carrying gears 12 and 13 of the left side paper supply mechanism.

46 is a shaft carrying gears 14 and 22, meshing respectively with gears 13 and 21, and gears 47 and 48 which engage the racks 49 and 50 and operate to drive the plunger 15.

51 is a pawl which engages a ratchet on the take-up spindle 23, and operates to prevent unwinding rotation.

52 is a sleeve loose and free to rotate on the shaft 45 and carrying gears 20 and 21 of the take-up mechanism.

53 is a sprocket loose on shaft 46 but rotated by reverse rotation of shaft 46 by means of the pawl 54 fast to the sprocket 53 and the ratchet 55 fast to the shaft 46, thus actuating the take-up spindle 23 through the sprocket 56 fast to the sleeve 82 loose on the spindle, the cup spring 83 also fast to the sleeve 82 which engages frictionally the spindle, and the sprocket chain 57.

58 is a shaft carrying gears 25 and 26 of the right side paper supply mechanism.

59 is a shaft carrying gears 27 and 34, meshing respectively with gears 26 and 33, and gears 60 and 61 which engage respectively the racks 62 and 63, and operate to drive the plunger 28.

64 is a pawl which engages a ratchet on the take-up spindle 35, and operates to prevent unwinding rotation.

65 is a sleeve loose and free to rotate on the shaft 58 and carrying gears 32 and 33 of the take-up mechanism.

66 is a sprocket loose on shaft 59 but rotated by reverse rotation of shaft 59 by means of the pawl 67 fast to the sprocket 66 and the ratchet 68 fast to the shaft 59, thus actuating the take-up spindle 35 through the sprocket 69 fast to the sleeve 84 loose on the spindle, the cup spring 85 also fast to the sleeve 84 which engages frictionally the spindle, and the sprocket chain 70.

71 and 71ª are springs which actuate the return movement of the barrier 2.

73 is a rack carried on the curved bar 2ª and adapted to be engaged by the pawl 72 to prevent depressing the barrier until it has been returned, after use of the seat, to its locked position above the seat and released by the deposit of another coin.

75 is a bell crank lever actuated alternately by the projections 74 and 78 to throw the pawl 72 in and out of engagement respectively with the rack 73, by means of the pitman 76.

79 is a spring which holds the pitman 76 in contact with the butt 77 of the pawl 72 until withdrawn by contact of the projection 74 with the bell crank lever 75.

80 and 81 are clamping fingers carried on the cross bar 6, which fold the paper over the beveled front edges 86 and 87 of the sides 17 and 30 respectively of the seat 18.

88 is a pawl fast to the gear 12, which is loose and free to rotate on shaft 45, and adapted to engage, during the downward movement of the rack 11, a ratchet 89 fast to the shaft 45, whereby the latter is rotated.

90 is a pawl fast to the gear 20, which is loose and free to rotate on the sleeve 52, and adapted to engage, during the downward movement of the rack 19, a ratchet 91 fast to the sleeve 52, whereby the latter is rotated.

92 is a pawl fast to the gear 25, which is loose and free to rotate on the shaft 58, and adapted to engage, during the downward movement of the rack 24, a ratchet 93 fast to the shaft 58, whereby the latter is rotated.

94 is a pawl fast to the gear 32, which is loose and free to rotate on the sleeve 65, and adapted to engage, during the downward movement of the rack 31, a ratchet 95 fast to the sleeve 65, whereby the latter is rotated.

The method of operation is as follows: A coin is deposited in the slot 8. This unlocks the lever 7ª. The lever is thrown, releasing the barrier 2 which is then depressed to its position below the seat 18 by pushing down the cross bar 6 until the barrier is caught by the latch 36. As the barrier is depressed the rack 11 engages the gear 12, thus rotating, by means of the pawl 88 fast to the gear 12 and the ratchet 89 fast to the shaft 45, the bevel gear 13, also fast to the shaft 45. The bevel gear 13 meshes with the bevel gear 14, fast to the shaft 46, and rotates the shaft 46. This rotates gears 47 and 48, fast to the shaft 46, which gears engage respectively racks 49 and 50 attached to the under side of the plunger 15. The plunger is thus advanced and a section of paper twice the width of the plunger is drawn from the reservoir spindle 16 over the side 37 of the superstructure of the seat 18. While the plunger is being advanced all possibility that used paper will be drawn out from the take-up spindle 23 is prevented by the pawl 51 which engages a ratchet 96 on the spindle and prevents unwinding rotation. When the plunger 15 has reached its most advanced position, the rack 11 ceases to engage the gear 12, and further advancing rotation of the shaft 46 consequently ceases. At the same moment the rack 19 engages the gear 20, thus rotating, by means of the pawl 90 fast to the gear 20 and the ratchet 91 fast to the sleeve 52, the bevel gear 21 also fast to the sleeve 52. The bevel gear 21 meshes with the bevel gear 22, fast to the shaft 46, and thus a rotary motion is again imparted to the shaft 46, but in the reverse direction. This reverse rotation of the shaft 46 through the gears 47 and 48 and racks 49 and 50 operates to withdraw the plunger 15, during which operation the slack section of used paper is taken up by the rotation of the spindle 23 actuated by a multiplying chain driven gear consisting of the sprocket 53 loose on shaft 46, but rotated during the reverse rotation of shaft 46 by the pawl 54, fast to the sprocket 53 and ratchet 55, fast to the shaft 46, the sprocket 56, fast to the sleeve 82, the cup spring 83 and the sprocket chain 57. In the same manner fresh paper is drawn over the opposite side 38 of the superstructure of the seat. As the barrier is depressed the rack 24 engages the gear 25, thus rotating, by means of the pawl 92 fast to the gear 25 and the ratchet 93 fast to the shaft 58, the bevel gear 26, also fast to the shaft 58. The bevel gear 26 meshes with the bevel gear 27, fast to the shaft 59 and rotates the shaft 59. This rotates gears 60 and 61 fast to shaft 59, which gears engage respectively racks 62 and 63 attached to the under side of the plunger 28. The plunger is thus advanced and a section of paper twice the width of the plunger is drawn from the reservoir spindle 29 over the side 38 of the superstructure of the seat 18. While the plunger is being advanced all possibility that used paper will be drawn from the take-up spindle 35 is prevented by the pawl 64 which engages a ratchet 97 on the spindle 35 and prevents unwinding rotation. When the plunger 28 has reached its most advanced position, the rack 24 ceases to engage the gear 25 and further advancing rotation of the shaft 59 consequently ceases. At the same moment the rack 31 engages the gear 32, thus rotating, by means of the pawl 94 fast to the gear 32 and the ratchet 95 fast to the sleeve 65, the bevel gear 33, also fast to the sleeve 65. The bevel gear 33 meshes with the bevel gear 34, fast to the shaft 59 and thus a rotary motion is again imparted to the shaft 59, but in the reverse direction. This reverse rotation of the shaft 59 through the gears 60 and 61 and racks 62 and 63, operates to withdraw the plunger 28 during which operation the slack section of used paper is taken up by the rotation of the spindle 35, actuated by a multiplying chain driven gear consisting of the sprocket 66 loose on shaft 59, but rotated during the reverse rotation of shaft 59 by the pawl 67, fast to the sprocket 66 and ratchet 68 fast to the shaft 59, the sprocket 69 fast to the sleeve 84, the cup spring 85 and the sprocket chain 70. As the barrier approaches the extreme point of depression the projection 74 on the quadrant 4 is brought into contact with the bell crank lever 75, the lever is thrown withdrawing the pitman 76 from contact with the butt 77 of the pawl 72, and the pawl is forced by the spring 72ª into engagement with the rack 73. At the same time the clamping fingers 80 and 81 fold the edges of the paper over the beveled front edges 86 and 87 of the sides 17 and 30 respectively of the seat 18. As the barrier reaches the extreme point of depression it is caught and locked as before stated by the latch 36. The operation of this latch is as follows:—As the barrier approaches the extreme point of depression, the pin 98 comes into contact with the latch 36, which is rigidly secured to the pivot shaft of the superstructure 38 at 38ª at a slight angle to the line of direction of motion of the pin, and forces the latch aside until the extreme point of depression is reached, at which point the pin 98 falls into the recess 36ª at the base of the latch 36. Actuated by the spring 40, the latch now returns to its normal position and the barrier is thus firmly locked until released by the weight of the occupant upon the superstructure 38. It is desirable but not essential that a latch of similar construction secured to the pivot shaft of the superstructure 37 be utilized in like manner on the opposite side of the device as shown in Fig. 1. The seat is now ready for use. The weight of the occupant brings sufficient pressure to bear upon the sides 37 and 38 of the superstructure of the seat 18 so that the springs 39 and 40 are compressed, the superstructure is depressed, and thus the latch 36 is tripped, releasing the barrier which is now held down by the legs of the occupant resting over the cross bar 6. As the occupant rises, the barrier, actuated by the springs 71 and 71ᵃ returns to its position above the seat. During this return movement depression of the barrier is prevented at all points by the pawl 72 in engagement with the rack 73. As the barrier reaches its extreme high point, the projection 78 on the quadrant 4 is brought into contact with the bell crank lever 75, the lever is thrown thus actuating the pitman which is brought into contact with the butt 77, throwing the pawl 72 out of engagement with the rack 73, in which position the pawl is held by the spring 79. Coincidentally the barrier is automatically locked and the device can now be operated only upon deposit of another coin.

What we claim and desire to secure by Letters Patent is:

1. In a sanitary toilet closet, the combination of a seat, a barrier in its normal position preventing the occupancy of the seat, means permitting the removal of the barrier, and means for automatically returning the barrier to its normal position.

2. In a sanitary toilet closet, the combination of a seat, a barrier in its normal position preventing the occupancy of the seat, means for permitting the removal of the barrier, and means for locking the barrier against return to its normal position.

3. In a sanitary toilet closet, the combination of a seat, a barrier in its normal position preventing the occupancy of the seat, means for permitting the removal of the barrier, and means for preventing the removal of the barrier at any point in its return path to a normal position.

4. In a sanitary toilet closet, the combination of a seat, means for feeding two independent strips of paper over portions of the surface of said seat, separated from each other by a substantial space, a barrier in its normal position preventing occupancy of said seat, means permitting the removal of the barrier, and means for automatically returning the barrier to its normal position.

5. In a sanitary toilet closet, the combination of a bowl and means for feeding a strip of paper above the bowl, said means embodying a horizontally reciprocating paper carrying plunger.

6. In a sanitary toilet closet, the combination of a bowl, means for feeding two strips of paper above the bowl, said means embodying two oppositely arranged horizontally reciprocating paper carrying plungers, and a common actuating mechanism.

7. In a sanitary toilet closet, the combination of a seat, means for feeding two independent strips of paper over portions of the surface of said seat separated by substantial space, said means for feeding said strips embodying two horizontally reciprocating paper carrying plungers, and a common actuating mechanism.

8. In a sanitary toilet closet, the combination of a seat, a plunger adapted to feed a strip of paper over said seat, and an independent double rack adapted to alternately advance and retract said plunger.

9. In a sanitary toilet closet, the combination of a seat, a plunger adapted to feed a strip of paper over said seat, a reservoir roll held under a constantly yielding and uniform tension, and a take-up roll driven by spring contact.

10. In a sanitary toilet closet, the combination of a seat, a plunger adapted to feed a strip of paper over said seat, an independent double rack adapted to alternately advance and retract said plunger, a barrier in its normal position preventing the occupancy of said seat, means permitting the removal of the barrier, and means for automatically returning the barrier to its normal position.

11. In a sanitary toilet closet, the combination of a seat, a plunger adapted to feed a strip of paper over said seat, a reservoir roll held under a constantly yielding and uniform tension, a take-up roll driven by spring contact, a barrier in its normal position preventing occupancy of said seat, means permitting the removal of the barrier, and means for automatically returning the barrier to its normal position.

12. In a sanitary toilet closet the combination of a seat, means for feeding a strip of paper over the surface of said seat embodying a horizontally reciprocating plunger, a barrier in its normal position preventing use of said seat, and means permitting the removal of said barrier.

13. In a sanitary toilet closet, the combination of a seat composed of a plurality of independent members not in contact with each other, independent means for feeding a separate strip of paper over the entire top surface of each of said members, each of said means embodying a horizontally reciprocating plunger, and a removable barrier in its normal position preventing occupancy of the seat.

In testimony whereof we have hereunto set our hands in presence of two subscribing witnesses, this second day of July 1912.

WARREN C. REES.
STANLEY ETHERINGTON.

Witnesses:
ROGER SHERMAN HOAR,
CARROLL L. PERKINS.